United States Patent Office 3,006,750
Patented Oct. 31, 1961

3,006,750
HERBICIDAL METHOD EMPLOYING PETROLEUM OIL CONTAINING HEXACHLOROCYCLOPENTADIENE
Lloyd S. Bovier, Niagara Falls, N.Y., and Homer E. Rea, College Station, Tex., assignors to Hooker Chemical Corporation, Niagara Falls, N.Y., a corporation of New York
No Drawing. Filed Nov. 17, 1958, Ser. No. 774,147
1 Claim. (Cl. 71—2.3)

This invention relates to an additive adapted to increase the effectiveness of known herbicidal compositions.

The present invention resides in the concept of adding hexachlorocyclopentadiene to herbicidal oils to increase the effectiveness of these oils. The embodiment of this concept has unique properties as a herbicide not logically predictable from the established herbicidal properties of the constituent ingredients.

Crown and basal oilings have been used to supplement other practices for controlling weeds interspersed in row crops. By crown oiling is meant applying the herbicidal oil at or near the junction of the stem and root of a plant. Basal treatment is defined as a plant treatment applied to the stems of plants near ground line. While these oils have been somewhat practical for killing or controlling the growth of young broadleaf weeds and grasses, their use for controlling the growth of older weeds, such as woody species and perennial grasses, has left much to be desired. It was, therefore, very surprising to discover that by adding a small amount of hexachlorocyclopentadiene (hereinafter referred to as C–56) to these herbicide oils their effectiveness for controlling older, woody species weeds and perennial grasses was greatly increased. Adding small quantities of C–56 for example to kerosene and kerosene based sprays increased their effectiveness for crown and basal treatment of Johnson grass, common careless weed, white careless weed, tie vine, silverleaf nightshade, coffee weed, puncture plant and purslane. C–56 is an ideal additive since it is oil soluble and goes in solutions conveniently, and at the same time appears to be an excellent solvent of plant waxes. In any additive of this type, a property of good additive solubility is desirable so as to insure substantial uniform distribution throughout the solvent used. It is quite desirable that the C–56 be soluble in the herbicidal oil used since a uniform result can be predicted upon a fixed addition of the additive. This is desirable since a fixed amount of C–56 may be sufficient for a selected situation, whereas it might not be in another. For example, kerosene containing a quart of C–56 per one hundred gallons of spray was effective for crown oiling six-inch Johnson grass, while two quarts of C–56 per one hundred gallons were required for effective treatment of Johnson grass nearing the boot stage. A plant is in the "boot stage" when the seed head of a plant begins to swell and emerge from the sheath. A two-quart solution of C–56 in kerosene was effective for treating stubs of grass in the boot stage, but a four-quart solution was needed for grass in the bloom or blossom stage. Both economy and effectiveness are predicted on a predetermined knowledge of the correct amount of additive required.

The plant wax dissolving property of C–56 is clearly desirable in increasing the contact surface of the weed to be exposed to the treating agent. This additive, therefore, increases the penetrating characteristics of herbicidal oils, and consequently increases the activity of this oil. C–56 greatly increases the penetration of the kerosene or oil into the plant tissue and increases the contact toxicity of the mixture, however, no systemic or residual effects were noted.

EXAMPLE 1

(To illustrate contact toxicity and plant wax dissolving property of C–56)

The use of C–56 in kerosene and some other oils for crown treatment of Johnson grass showed the contact and penetrating quantities of this additive and its lack of translocated and residual effects.

The contact toxicity of C–56 was shown by using it in Sovaspray–100 (a special naphtha with very low contact phytotoxicity, Sovaspray–100 is a low-viscosity, colorless, virtually odorless oil). Undiluted Sovaspray–100 penetrated the basal tissue and killed the growing point when applied to the crown of a six-inch Johnson grass sprout. It did not, however, kill the enveloping leaves, although it turned them red for a few days. Similar application of Sovaspray–100 fortified with a quart or more of C–56 per one hundred gallons killed six-inch sprouts to the ground within a few hours. The penetrating quality of the Sovaspray–100 was increased by the addition of C–56, and resulted in increased activity of this herbicidal oil.

Ordinary naphtha is more toxic than kerosene and kills tender Johnson grass promptly when it is applied to their crown. Crown and basal applications of naphtha do not kill stems of this grass after they become glazed, at and after the boot stage of growth. Adding a strong contact herbicide, such as dinitro (a nitrated alkylated phenol), to the naphtha does not improve its effectiveness for treating glazed stems of this grass. The difference in the effectiveness of these sprays with C–56 added is most easily explained on the basis of difference in penetration. C–56 is an excellent solvent of plant waxes.

EXAMPLE 2

(To illustrate lack of residual effect of C–56 oil composition)

Killing sprouts arising from a Johnson grass rootstock by crown oiling them with kerosene fortified with C–56 retarded but did not prevent "resprouting" from the rootstock. Untreated new sprouts made normal growth and showed no systemic symptoms. Delay in resprouting appeared to be caused by the fortified oil seeping farther or deeper and killing more of the rootstock than is usual for an oil spray without C–56. Broadcast applications of three hundred gallons per acre of kerosene containing one and one-half gallons of C–56 had no effect on the subsequent emergence or growth of Johnson grass and other seedlings in contaminated soil.

EXAMPLE 3

(To illustrate increased penetration due to adding C–56)

Careless weed and pigweed are common names for many species of Amaranthus–A. Scattered plants of this species left in cotton by hoe hands are conspicuous after their tops appear above the crop. By that time they are ten to thirty inches tall and are resistant to basal treatment with oil sprays commonly used for crown-treating Johnson grass sprouts. A. alba is a closely branched species which occurs in some fields. Basal treatment of this species is impractical after the plants are ten inches tall. The stems soon become resistant to common oils. Kerosene containing a gallon of C–56 per one hundred gallons of spray was the most reliable and economical mixture found for the basal treatment of A. retroflexus up to thirty inches tall and A. alba up to ten inches in height. Older plants of these species are difficult to kill by basal application of any spray. Older careless weeds are resistant to undiluted oil because the oil does not completely penetrate the stem tissue. The additive (C–56) increases penetration enough to kill careless weeds ten to thirty inches tall but not enough to kill those thirty to sixty inches tall. The taller the careless weed, the larger the diameter of the stem at the ground.

EXAMPLE 4

Tie-vine (*Ipomoea trifida*) is a perennial morning glory. Most of any contact spray will destroy tie-vine seedlings before their roots become fleshy. Their susceptibility thereafter to crown treatment with a contact spray is similar to that of tie-vine sprouts with comparable root systems. Crowns of tie-vine are easy to locate before the runners are twelve inches long, but later they are hidden by the foliage and the runners. Contact foliage sprays only retard the growth of tie-vine sprouts.

Kerosene containing a gallon of C-56 and a pint of oil soluble dinitro (dinitro-o-sec-butyl-phenol) per one hundred gallons of spray applied to the crowns killed the tie-vine sprouts to a depth of three to seven inches below the surface. One may use a spray without the dinitro if desired. Also the amounts of the spray ingredients may be varied depending upon the present specific situation. For example, a spray may be used having from fifty to one hundred parts of oil, from 0.5 to 5.0 parts C-56, and from 0.1 to 3.0 parts dinitro. Resprouting was prevented or retarded depending on the proportion of the root system killed. Plants with less than six sprouts and roots less than one-quarter inch in diameter usually were eradicated. Plants sprouting from large root stumps two to three inches below the surface were not affected seriously. Other contact sprays that were equally effective were much more expensive.

EXAMPLE 5

Crown application of kerosene containing one-half gallon of C-56 per one hundred gallons of spray killed puncture plant( *Tribulus terrestris*) in any stage of growth and purslane (*Portulaca oleracea*) in the mat stage. "Mat stage" means prostrate flat on soil surface before upright growth is started. Basal treatment of silverleaf nightshade (*Solanum eleagnifolium*) with kerosene containing a gallon of C-56 and a pint of oil soluble dinitro per one hundred gallons of spray killed sprouts in ten to fifteen days and greatly retarded resprouting. Treatment of the lower twelve inches of coffee weed (*Daubentonia* spp.) stems with a diameter of one inch or more with kerosene containing one-half gallon of C-56 and one gallon of Silvex ester (Kuron) per one hundred gallons of spray killed this species promptly and was more reliable than a similar spray without C-56. Examples 4 and 5 are also illustrative of increase in rate and degree of penetration due to the addition of C-56. Species such as careless weed and purslane are fleshy and their stems become extremely constricted in diameter as they die from application of a mixture of C-56 and oil. They are only slightly constricted by application of undiluted oil and the live inner portion of the stem continues to sustain the plant and it soon recovers.

Kerosene and many other petroleum fractions have been rated for crown-treatment of established weeds in many tests. The toxicity of kerosene is moderate and when used alone, it is not acceptable for general crown-oiling of weeds. For example, on Johnson grass, the effectiveness of kerosene for crown and basal treatment is greatly improved by the addition of C-56. Crown treatment of old Johnson grass in boot with one part of C-56 per eighty parts of kerosene killed the crowns and caused lodging within twelve hours. This was superior to earlier results with any oil alone. The C-56 improved both the penetrating and spreading properties of these oils.

The amount of C-56 which may be added to the oil, of course, will vary depending on the type weeds to be treated, soil and atmosphere conditions, age of weed, etc.

Combinations of the composition of this invention with other known herbicides or compositions for controlling the growth of vegetation and plants to obtain desirable combinations and properties are within the spirit of this invention.

The examples of the compositions of our invention, formulations and methods of use, which have been described in the foregoing specification, have been given for purpose of illustration, not limitation. Many other modifications and ramifications will naturally suggest themselves to those skilled in the art, based on the disclosure of our basic discovery. These are intended to be comprehended within the scope of our invention.

This application is a continuation-in-part of Serial Number 710,618, filed in the United States Patent Office, March 7, 1958, and now abandoned.

We claim:

A method for the control of Johnson grass which comprises crown and basal oiling the weeds to be treated with a herbicidal amount of a composition comprising in phytotoxic concentration a petroleum oil containing dissolved therein up to about one part by volume of hexachlorocyclopentadiene per hundred parts of petroleum oil.

References Cited in the file of this patent

UNITED STATES PATENTS

| | | |
|---|---|---|
| 2,548,509 | Yowell | Apr. 19, 1951 |
| 2,704,246 | Goodhue et al. | Mar. 15, 1955 |
| 2,713,535 | Patrick | July 19, 1955 |
| 2,841,483 | Swezey et al. | July 1, 1958 |

OTHER REFERENCES

Worley et al. in "Weeds," vol. 5, April 1957, No. 2, pages 121–132.